United States Patent
Kim et al.

(10) Patent No.: US 6,226,532 B1
(45) Date of Patent: May 1, 2001

(54) CELLULAR TELEPHONE WITH VOICE DIALING FUNCTION

(75) Inventors: Duck-Hwan Kim; Seo-Yong Chin, both of Kyonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/119,284

(22) Filed: Jul. 20, 1998

(30) Foreign Application Priority Data

Jul. 21, 1997 (KR) .................................................. 97-33965

(51) Int. Cl.⁷ ....................................................... H04B 1/38
(52) U.S. Cl. .......................... 455/563; 455/569; 455/575; 379/88.01; 704/275
(58) Field of Search .................................... 455/563, 564, 455/568–569, 575, 351; 379/433, 431, 67.1, 88, 361, 356–355, 216, 88.01–88.04; 704/275

(56) References Cited

U.S. PATENT DOCUMENTS

| | | |
|---|---|---|
| 4,731,811 | 3/1988 | Dubus . |
| 5,042,063 * | 8/1991 | Sakanishi et al. .................... 455/564 |
| 5,222,121 * | 6/1993 | Shimada ................................ 455/564 |
| 5,301,227 * | 4/1994 | Kamei et al. ......................... 455/564 |
| 5,353,376 | 10/1994 | Oh et al. . |
| 5,371,779 | 12/1994 | Kobayashi . |
| 5,481,595 * | 1/1996 | Ohashi et al. ........................ 455/564 |
| 5,805,672 * | 9/1998 | Barkat et al. ........................ 455/564 |

* cited by examiner

*Primary Examiner*—Doris H. To
(74) *Attorney, Agent, or Firm*—Dilworth & Barrese, LLP

(57) ABSTRACT

A cellular telephone with a voice dialing function effectively manages a voice recognition memory. The cellular telephone is capable of being connected to a hands-free kit, and has a voice recognition device for extracting feature data from an input voice signal so as to recognize the voice signal and a memory for storing the extended feature data. The memory is divided into a first storage area for storing the feature data input from the cellular telephone, a second storage area for storing the feature data input from the hands-free kit, and a third storage area for storing voice playback data. The third storage area includes a storage region for storing the voice playback data and another storage region for storing a telephone number associated with the voice playback data.

10 Claims, 4 Drawing Sheets

| INDEX DATA STORAGE AREA (SA1) | STORAGE AREA FOR HANDSET (SA2) | | COMMON STORAGE AREA (SA3) | | STORAGE AREA FOR HANDS-FREE KIT (SA4) | |
|---|---|---|---|---|---|---|
| $I_1$ | $F_{hs}1$ | $F_{hs}2$ | TEL NO | VP | $F_{hf}1$ | $F_{hf}2$ |
| ⋮ | ⋮ | ⋮ | ⋮ | ⋮ | ⋮ | ⋮ |

| INDEX DATA STORAGE AREA (Mi) | STORAGE AREA FOR HANDSET (Mhs) | | | STORAGE AREA FOR HANDS-FREE KIT (Mhf) | | |
|---|---|---|---|---|---|---|
| I1 | Fhs1 | Fhs2 | VP1 | Fhf1 | Fhf2 | VP2 |
| ⋮ | ⋮ | ⋮ | ⋮ | ⋮ | ⋮ | ⋮ |

FIG. 1

| INDEX DATA STORAGE AREA (SA1) | STORAGE AREA FOR HANDSET (SA2) | | COMMON STORAGE AREA (SA3) | | STORAGE AREA FOR HANDS-FREE KIT (SA4) | |
|---|---|---|---|---|---|---|
| I1 | Fhs1 | Fhs2 | TEL NO | VP | Fhf1 | Fhf2 |
| ⋮ | ⋮ | ⋮ | ⋮ | ⋮ | ⋮ | ⋮ |

FIG. 3

CELLULAR TELEPHONE WITH VOICE DIALING FUNCTION

FIELD OF THE INVENTION

The present invention relates to cellular telephones, and in particular, to a cellular telephone having a voice dialing function.

DESCRIPTION OF THE RELATED ART

A cellular telephone having a voice dialing function employs a voice recognition device, which extracts features such as frequency from the input voice signals in order to recognize the input voice. In general, the voice recognition device has a large number of input voice signals to process, which may cause overload on the device.

A known voice dialing method for solving the overload problem is to utilize a hands-free kit including a digital signal processor (DSP) and a nonvolatile memory (e.g., flash memory or EEPROM (Electrically Erasable and Programmable Read Only Memory)). The DSP in the hands-free kit extracts the feature data from the input voice signals and stores the extracted feature data in the nonvolatile memory (i.e., a voice recognition memory) as reference feature data. Upon receipt of a voice dialing command, the DSP compares the feature data of the input voice signals with the reference feature data registered in the voice recognition memory to recognize the input voice signals, and provides the voice recognition results to the cellular telephone. The cellular telephone then dials a telephone number according to the voice recognition results. The voice recognition memory is divided into three storage areas; a first storage area for index data; a second storage area for storing information of the voice signal input from a microphone of the cellular telephone; and a third storage area for storing information of the voice signal input from a microphone of the hands-free kit.

FIG. 1 illustrates a memory map for the voice recognition memory according to the prior art. As illustrated, the voice recognition memory is divided into three storage areas Mi, Mhs, and Mhf. The storage area Mi stores the index data and the storage area Mhs stores the reference feature data Fhs1 and Fhs2 and voice playback data VP1 of the voice signals input from the cellular telephone handset. The storage area Mhf stores the reference feature data Fhf1 and Fhf2 and voice playback data VP2 of the voice signal input from the hands-free kit.

The reason that the voice recognition memory is divided into the storage areas Mhs and Mhf having the same structure is that even though a certain word is pronounced by the same user, the feature data output from the hands-free kit may be different from the feature data output from the cellular telephone handset. Therefore, the reference feature data Fhs1 and Fhs2 for the cellular telephone handset and the reference feature data Fhf1 and Fhf2 for the hands-free kit are separately stored in the storage areas Mhs and Mhf, respectively. Further, the conventional voice recognition memory stores the voice playback data VP1 and VP2 separately in the respective storage areas Mhs and Mhf, thereby reducing efficiency of the memory.

However, since the voice playback data VP1 and VP2 are used in playing back the voice of the word that the user pronounced, it is not necessary to store the voice playback data VP1 and VP2 separately. Rather, it is preferable that a selected one of the voice playback data VP1 and VP2 is stored in the voice recognition memory.

In general, the storage regions for the voice playback data VP1 and VP2 are much larger in capacity than the storage regions for the feature data Fhs1, Fhs2, Fhf1 and Fhf2. Therefore, it is uneconomical for the voice recognition memory to have the two voice playback storage regions VP1 and VP2 for the same use. In addition, the voice recognition memory with the high storage capacity has increased power consumption, which may cause a reduction of the serviceable duration of the telephone battery.

SUMMARY OF THE INVENTION

It is therefore an object of the present invention to provide a cellular telephone with a voice dialing function in which a voice recognition memory is effectively and efficiently managed.

To achieve the above object, the present invention provides a cellular telephone capable of being connected to a hands-free kit, and having a voice recognition device for extracting feature data from an input voice signal so as to recognize the voice signal, and a memory for storing the feature data. The memory is divided into a first storage area for storing index data, a second storage area for storing the feature data input from the cellular telephone, a third storage area for storing which the feature data input from the hands-free kit, and a fourth storage area for storing voice playback data. The fourth storage area comprises a storage region for storing the voice playback data and another storage region for storing a telephone number.

Preferably, the index data comprises a first address where the feature data input from the cellular telephone is stored, a second address where the feature data input from the hands-free kit is stored, and a third address where the telephone number and the voice playback data are stored.

BRIEF DESCRIPTION OF THE DRAWINGS

The foregoing and other objects, features and advantages of the present invention will become more apparent from the following detailed description when taken in conjunction with the accompanying drawings in which:

FIG. 1 is a diagram illustrating a memory map for a voice recognition memory according to the prior art;

FIG. 3 is a diagram illustrating a memory map for a voice recognition memory according to an embodiment of the present invention;

DETAILED DESCRIPTION OF PREFERRED EMBODIMENTS

A preferred embodiment of the present invention will be described in detail hereinbelow with reference to the accompanying drawings. For comprehensive understanding of the present invention, the present invention will be illustratively described, confined to the specific embodiment. However, it should be noted that the present invention can be implemented by anyone skilled in the art with the description. In the following description, well-known functions or constructions which may obscure the present invention in unnecessary detail are not described in detail.

The present invention is directed to recognizing an input voice signal by utilizing packet data output from a vocoder (voice encoder) included in the cellular telephone. Therefore, the cellular telephone can recognize the voice signal without assistance of the DSP in the hands-free kit.

Figure 2:
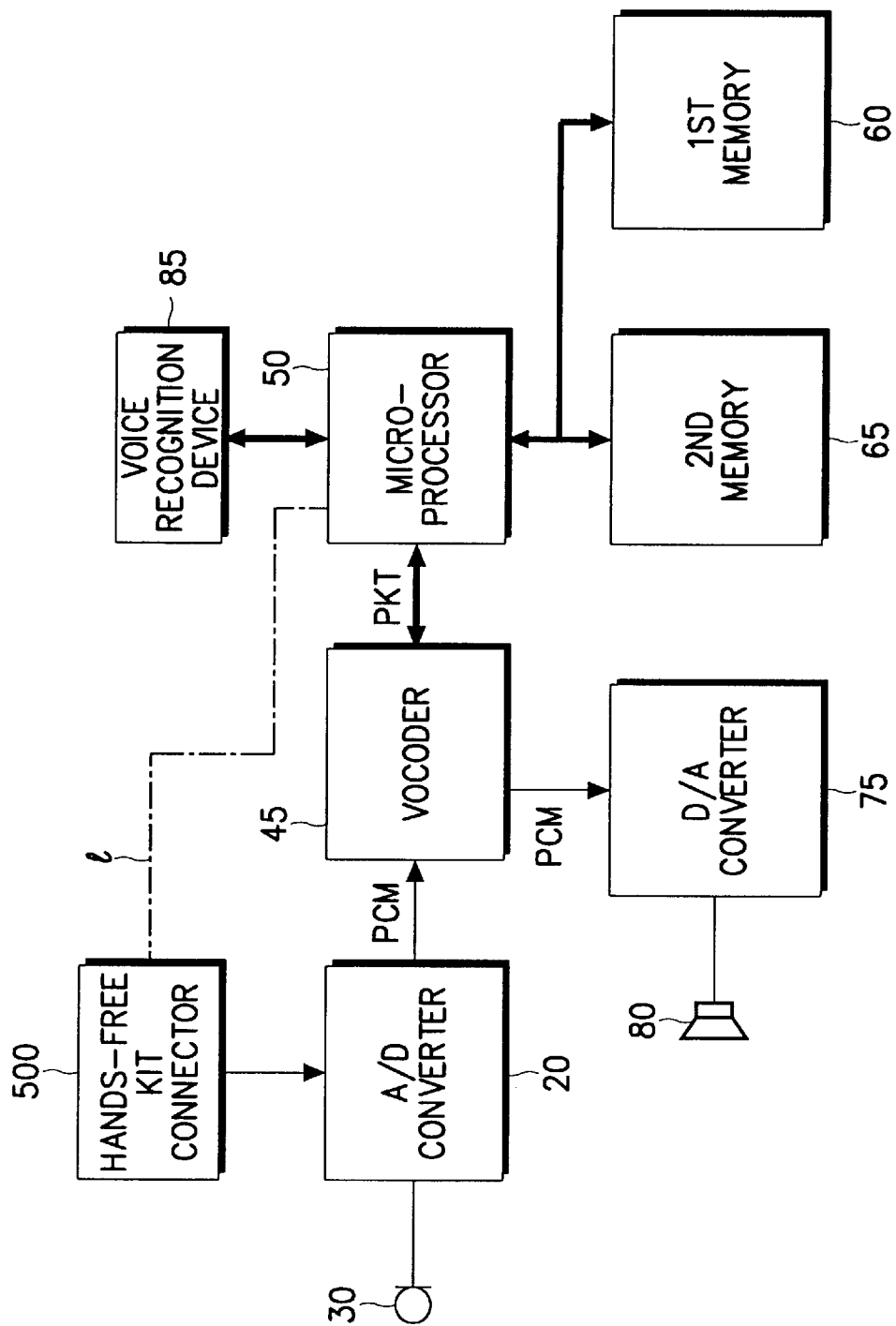
FIG. 2 is a block diagram of a cellular telephone with a voice dialing function, to which the present invention is applied.

FIG. 2 illustrates a portable cellular telephone having a voice dialing function to which the present invention is applied. The RF (Radio Frequency) circuit and a DTMF (Dual Tone Multi-Frequency) circuit have been removed from the drawing since they are not related to the present invention.

Referring to FIG. 2, an analog voice signal input from a microphone 30 is converted to a digital PCM (Pulse Code Modulation) signal by an analog-to-digital (A/D) converter 20. A vocoder 45 compresses the PCM signal output from the A/D converter 20 and outputs predetermined packet data PKT. In a CDMA cellular telephone, the vocoder 45 can be realized by an 8 Kbps QCELP (Qualcomm Code Excited Linear Predictive coding), 13 Kbps QCELP, and 8 Kbps EVRC (Enhanced Variable Rate Coding) encoders, and in a GSM (Global System for Mobile Communications) cellular telephone, it can be realized by an RPE-LTP (Regular Pulse Excitation with Long Term Prediction) encoder.

The packet data PKT output from the vocoder 45 is applied to a microprocessor 50 which controls the overall operation of the cellular telephone. A first memory 60, being a nonvolatile memory (e.g., a flash memory or EEPROM), stores a control program and initial service data. A second memory 65, being a RAM (Random Access Memory), temporarily stores various data generated during operation of the cellular telephone such as packet data for input voice signals, for registration or recognition.

A voice recognition device 85 outputs the feature data extracted from the packet data of the input voice signals at a transfer rate of 20 bytes/sec. The feature data is used for voice recognition and includes tens to hundreds of bytes includes the frequency feature and the intensity of the input voice signal. The voice recognition device 85 can be realized by either hardware or software. When the voice recognition device 85 is realized by software, the software program can be stored in the first memory 60. The microprocessor 50 delivers the packet data PKT output from the vocoder 45 to the voice recognition device 85, and dials a telephone number according to the index data output from the voice recognition device 85. In addition, the microprocessor 50 stores, in an internal memory thereof, an address of the first memory 60 where the packet data output from the vocoder 45 is stored, and reads the packet data from the first memory 60 by using the address to inform the user that the voice is completely recognized. For convenience, the read packet data is called the voice playback data VP. The vocoder 45 converts the voice playback data VP into a PCM signal and applies it to a digital-to-analog (D/A) converter 75, which converts the input PCM signal to an analog signal and outputs the converted analog signal through a speaker 80. Instead of the voice playback data, a message for informing the completion of the voice recognition may be stored in the first memory 60.

A hands-free kit connector 500 connects the cellular telephone to a hands-free kit (not shown) and delivers the voice signal input from a microphone of the hands-free kit to the A/D converter 20 which converts the input voice signal to a digital signal.

The hands-free kit connector 500 is connected to a specific port of the microprocessor 50, to enable it to determine whether the input voice signal is received from the microphone 30 of the cellular telephone or the microphone of the hands-free kit. The microprocessor 50 and the hands-free kit connector 500 constitute a means for sensing the source of the input voice signal.

FIG. 3 shows a memory map of the voice recognition memory (i.e., the first memory 60) according to the present invention. As illustrated, the first memory 60 is divided into a storage area SA1 for storing index data, a second storage area SA2 for storing information of thee voice signals input from the cellular telephone, a storage area SA4 for storing information of the voice signals input from the hands-free kit, and a common storage area SA3 for storing the voice playback data VP and a telephone number. The second storage area SA2 stores the reference feature data Fhs1 and Fhs2 of the voice signals input from the cellular telephone handset in association with the index data. The third storage area SA3 stores the voice playback data VP and the telephone number, and the fourth storage area SA4 stores the reference feature data Fhf1 and Fhf2 of the voice signals input from the hands-free kit in association with the index data. The index data I1 may include addresses where the feature data Fhs1, Fhs2, Fhf1 and Fhf2 are stored, and an address where the telephone number and the voice playback data VP are stored. In case the cellular telephone has a separate address generator, the first storage area SA1 is unnecessary.

As shown in FIG. 3, each of the second and fourth storage areas SA2 and SA4 is divided again into two storage regions for storing the reference feature data Fhs1 and Fhs2, and Fhf1 and Fhf2, respectively. This is because the voice signals, though pronounced by the same user, may be different from each other whenever the user pronounces them. Therefore, the reference feature data is extracted twice for the same word that the user pronounced, and stored in the two storage regions separately.

Figure 4:
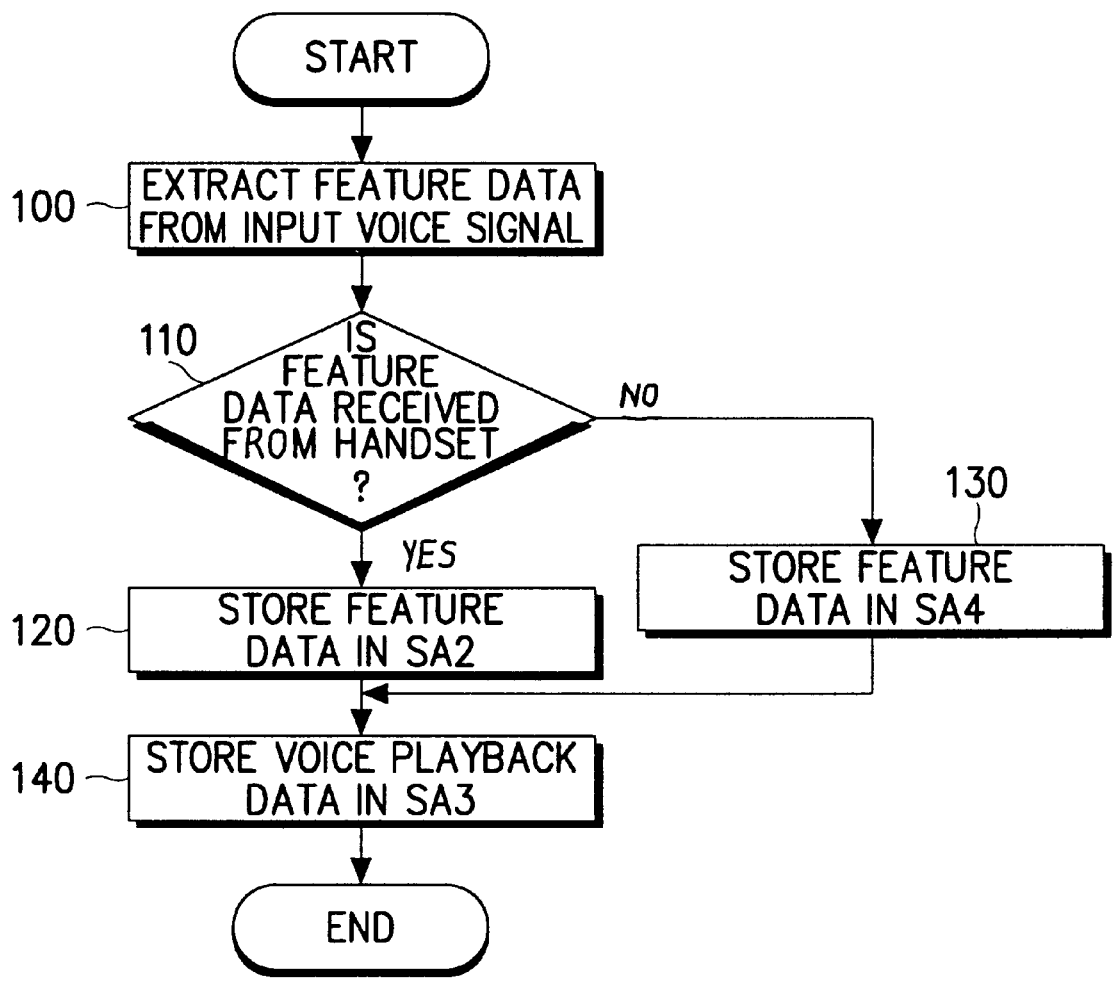
FIG. 4 is a flowchart for controlling the voice recognition memory of FIG. 3 during a voice registering process.

FIG. 4 is a flowchart for controlling the first memory 60 during a voice registering process. If the user pronounces a certain word (e.g., a name of the person to whom the user desires to call) through the microphone 30, the voice recognition device 85 recognizes the voice signal input from the microphone 30. When the user pronounces the word through the microphone of the hands-free kit, the voice recognition device 85 recognizes the voice signal received from the hands-free kit via the hands-free kit connector 500. Microprocessor 50 extracts the reference feature data from the input voice signals in step 100, and determines the source of the received voice signals in step 110 by checking whether or not the cellular telephone is connected to the hands-free kit. If the cellular telephone is not connected to the hands-free kit (i.e., data is received from the handset), the microprocessor 50 stores the reference feature data Fhs1 and Fhs2 in the second storage area SA2 of the first memory 60 (step 120), based on the determination that they originated from the cellular telephone handset. However, if the cellular telephone is connected to the hands-free kit (i.e., data is not received from the handset), the microprocessor 50 stores the reference feature data Fhf1 and Fhf2 in the fourth storage area SA4 of the first memory 60 (step 130). After storage of the feature data, the microprocessor 50 controls the voice recognition device 85 to store the input voice signal as the voice playback data VP in the third storage area SA3, together with its corresponding telephone number (step 140).

Figure 5:
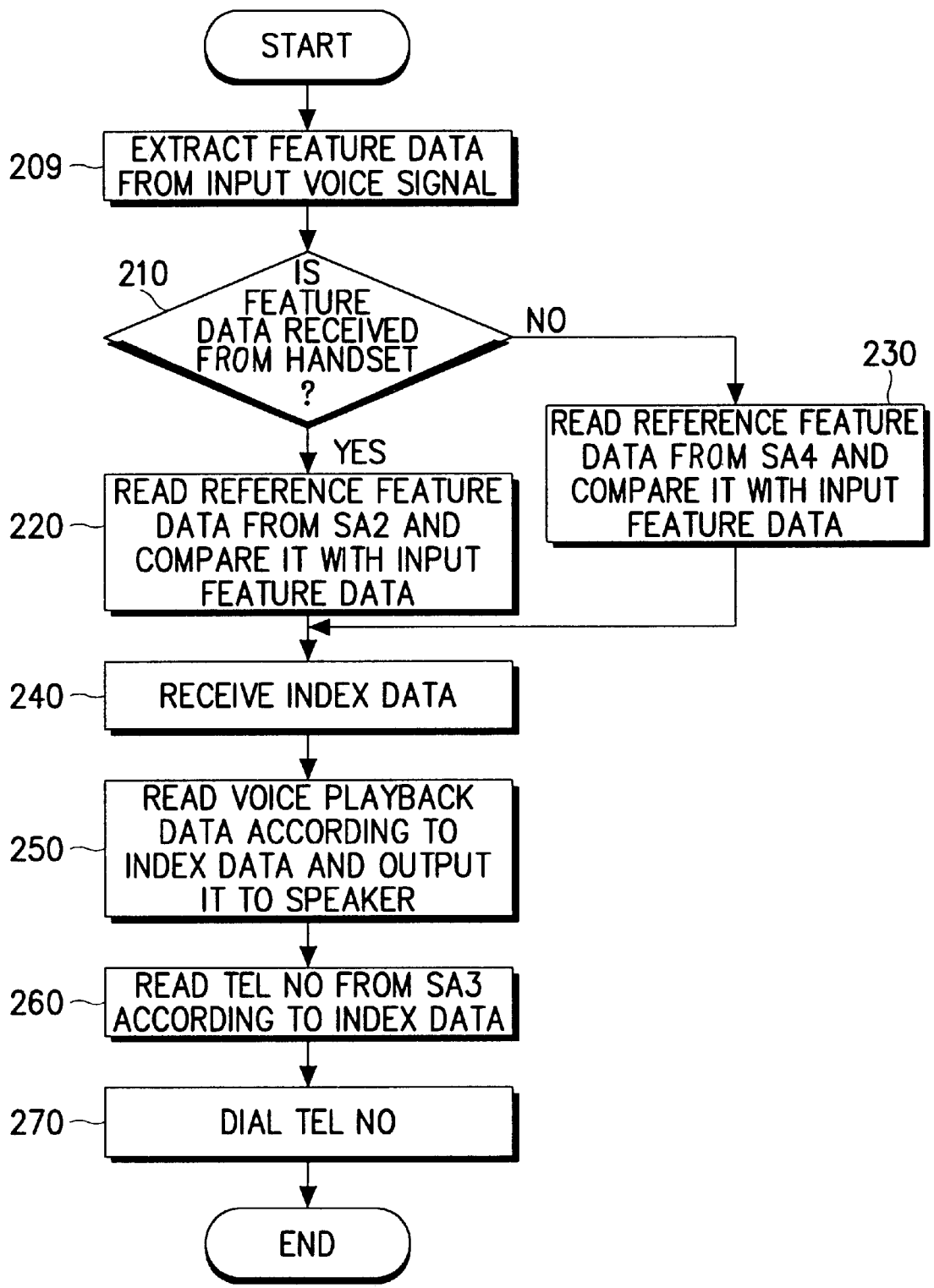
FIG. 5 is a flowchart for controlling the voice recognition memory of FIG. 3 during a voice recognizing process.

FIG. 5 is a flowchart for controlling the first memory 60 during the voice recognizing process. If the user pronounces the name registered in the cellular telephone to dial the telephone number by voice, the voice recognition device 85 extracts the feature data from the input voice signal and then compares the feature data with the reference feature data registered in the first memory 60. If the input feature data is similar to the reference feature data, the voice recognition device 85 outputs the index data corresponding to the feature data together with a difference value therebetween to the microprocessor 50.

Referring to FIGS. 2 and 5, the microprocessor 50 extracts the feature data of the input voice signal from the voice recognition device 85 (step 209), and determines the source of the feature data by checking whether or not the cellular telephone is connected to the hands-free kit (step 210). If the received feature data originates from the cellular telephone handset, the microprocessor 50 controls the voice recognition device 85 to read the reference feature data Fhs1 and Fhs2 from the second storage area SA2 of the first memory 60 and compares them with the received feature data so as to generate the index data and a difference value therebetween (step 220). However, if the received feature data originates from the hands-free kit, the microprocessor 50 controls the voice recognition device 85 to read the reference feature data Fhf1 and Fhf2 from the fourth storage area SA4 of the first memory 60 and compare them with the received feature data so as to generate the index data and the difference value therebetween (step 230). Thereafter, the microprocessor 50 receives the index data and the difference value from the voice recognition device 85 (step 240), and reads the voice playback data VP from the third storage area SA3 according to the index data output from the voice recognition device 85 (step 250). The read voice playback data VP is output to the speaker 80. Subsequently, the microprocessor 50 reads the telephone number from the third storage area SA3 according to the index data (step 260), and dials the read telephone number in step 270.

As described above, the cellular telephone effectively manages the voice recognition memory, thereby contributing to reduction of the product cost and power consumption.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A cellular telephone capable of being connected to a hands-free kit, and having a voice recognition device for extracting feature data from an input voice signal so as to recognize the input voice signal, comprising:
    a memory divided into a first storage area for storing the feature data input from the cellular telephone, a second storage area for storing the feature data input from the hands-free kit, and a third storage area for storing voice playback data, wherein the stored voice playback data is the same voice playback data for both the cellular telephone and the hands-free kit.

2. The cellular telephone as claimed in claim 1, wherein said third storage area comprises a storage region for storing the voice playback data and another storage region for storing a telephone number.

3. The cellular telephone as claimed in claim 1, further comprising a means for determining whether the feature data originates from the cellular telephone or the hands-free kit.

4. The cellular telephone as claimed in claim 3, further comprising:
    a first address generator for generating a handset address or a hands-free kit memory address for registering or recognizing the feature data according to an output of said determining means; and
    a second address generator for generating a voice playback memory address for having the voice playback data shared for a cellular telephone input voice and a hands-free kit input voice by registering only one input voice of the cellular telephone and the hands-free kit input voices.

5. A cellular telephone capable of being connected to a hands-free kit, and having a vocoder, the cellular telephone comprising:
    a voice recognition memory comprising;
        a first storage area for registering feature data input from the cellular telephone;
        a second storage area for registering the feature data input from the hands-free kit; and
        a third storage area for registering voice playback data;
    means for determining whether the feature data originates from the cellular telephone or the hands-free kit;
    a voice recognition device for extracting the feature data from a voice signal by processing packet data output from the vocoder, comparing the extracted feature data with the registered feature data according to an output of the determining means, and outputting index data having an address where the feature data is stored when the extracted feature data is similar to the registered feature data; and
    a microprocessor for reading an address where the voice playback data is stored, reading and outputting the voice playback data, reading a telephone number according to the index data, and dialing the read telephone number.

6. The cellular telephone as claimed in claim 5, wherein the third storage area comprises a storage region for storing the voice playback data and another storage region for storing the telephone number.

7. A method for controlling a voice recognition memory during a voice registering process in a cellular telephone having a voice dialing function comprising the steps of:
    extracting feature data from an input voice signal;
    determining whether the extracted feature data is received from a cellular telephone handset or a cellular telephone hands-free kit;

storing the extracted feature data in one of two storage areas in response to said determination; and storing voice playback data in a third storage area different than the two storage areas for the extracted feature data, wherein the stored voice playback data is the same voice playback data for both the cellular telephone and the hands-free kit.

8. A method for controlling a voice recognition memory during a voice recognizing process in a cellular telephone having a voice dialing function comprising the steps of:

extracting input feature data from an input voice signal;

determining whether the extracted feature data is received from a cellular telephone handset or a cellular telephone hands-free kit;

reading reference feature data from one of two storage areas in the voice recognition memory in response to said determination;

comparing the read reference feature data to the input feature data;

generating index data in response to said comparison;

reading voice playback data from a third storage area in the voice recognition memory in response to the generated index data and outputting it to a speaker;

reading telephone number information from the third storage area in response to the index data; and dialing the read telephone number.

9. A cellular telephone capable of being connected to a hands-free kit, and having a voice recognition device for extracting feature data from an input voice signal so as to recognize the input voice signal, comprising:

a memory divided into a first storage area for storing the feature data input from the cellular telephone;

a second storage area for storing the feature data input from the hands-free kit; and a third storage area which is common to the feature data input from both the cellular telephone and the hands-free kit for storing voice playback data.

10. A method for controlling a voice recognition memory during a voice registering process in a cellular telephone having a voice dialing function comprising the steps of:

extracting feature data from an input voice signal;

determining whether the extracted feature data is received from a cellular telephone or a cellular telephone hands-free kit;

storing the extracted feature data in one of two storage areas in response to said determination; and storing voice playback data in a third storage area which is common to the feature data received from both the cellular telephone handset and the cellular telephone hands-free kit and is different than the two storage areas for the extracted feature data.

* * * * *